US008154570B2

(12) United States Patent
Blank et al.

(10) Patent No.: US 8,154,570 B2
(45) Date of Patent: Apr. 10, 2012

(54) ARRANGEMENT WITH A MOBILE DATA CARRIER AND A HAND-HELD DEVICE

(75) Inventors: Joachim Blank, Villingen-Schwenningen (DE); Roland Gessner, Zimmern ob Rottweil (DE); Patrik Helbig, Donaueschingen (DE)

(73) Assignee: Continental Automotive GmbH, Hannover (DE)

(*) Notice: Subject to any disclaimer, the term of this patent is extended or adjusted under 35 U.S.C. 154(b) by 850 days.

(21) Appl. No.: 12/066,337

(22) PCT Filed: Sep. 7, 2006

(86) PCT No.: PCT/EP2006/066117

§ 371 (c)(1), (2), (4) Date: Sep. 26, 2008

(87) PCT Pub. No.: WO2007/031460

PCT Pub. Date: Mar. 22, 2007

(65) Prior Publication Data

US 2009/0153598 A1 Jun. 18, 2009

(30) Foreign Application Priority Data

Sep. 13, 2005 (DE) ........................ 10 2005 043 624

(51) Int. Cl.
*G01D 9/00* (2006.01)

(52) U.S. Cl. ......... 346/20; 346/30; 340/572.1; 340/10.1

(58) Field of Classification Search .... 340/572.1–572.8, 340/10.1, 999; 346/20, 30; 235/375, 385
See application file for complete search history.

(56) References Cited

U.S. PATENT DOCUMENTS

| | | | | |
|---|---|---|---|---|
| 4,188,618 | A * | 2/1980 | Weisbart | 340/870.16 |
| 4,644,368 | A * | 2/1987 | Mutz | 340/439 |
| 6,141,609 | A * | 10/2000 | Herdeg et al. | 340/995.1 |
| 6,141,610 | A * | 10/2000 | Rothert et al. | 340/438 |
| 6,629,029 | B1 * | 9/2003 | Giles | 701/35 |

(Continued)

FOREIGN PATENT DOCUMENTS

DE 3505068 2/1985

(Continued)

OTHER PUBLICATIONS

Council Regulation (EEC) No. 3820/85 of Dec. 1985 on the harmonization of certain social legislation relating to road transport; 31985R3820, Dec. 1985.

(Continued)

*Primary Examiner* — Eric M Blount
(74) *Attorney, Agent, or Firm* — King & Spalding L.L.P.

(57) ABSTRACT

An arrangement (1) with a mobile data carrier (2) and a handheld device (4) displays driving periods, rest periods and other types of activity recorded by a tachograph and evaluated by the hand-held device (4). The hand-held device has an evaluation unit (11), a display unit (6) and an input unit. In order to minimize the outlay necessary for evaluating the periods of time, the recording data (20) stored in digital form in a memory of the mobile data carrier (2) designed as a data card (3) can be transmitted via a data transmission interface (17), to computers or notebooks in the transport company or in the vehicle of the control units, and the evaluation unit (11) determines and evaluates the driving periods and/or rest periods and/or the period of time spent in other types of activity.

27 Claims, 1 Drawing Sheet

U.S. PATENT DOCUMENTS

| | | | | |
|---|---|---|---|---|
| 7,002,579 | B2 * | 2/2006 | Olson | 340/500 |
| 2002/0183905 | A1 * | 12/2002 | Maeda et al. | 340/438 |
| 2007/0038342 | A1 * | 2/2007 | Grana et al. | 701/29 |
| 2007/0038349 | A1 * | 2/2007 | Larschan et al. | 701/35 |

FOREIGN PATENT DOCUMENTS

| | | | |
|---|---|---|---|
| DE | 19533515 | | 8/1995 |
| DE | 10144002 | | 9/2001 |
| DE | 10334461 | | 7/2003 |
| EP | 592166 | A2 * | 4/1994 |
| GB | 2271180 | | 4/1994 |

OTHER PUBLICATIONS

International Search Report; PCT/EP2006/066117; pp. 5, Sep. 7, 2006.

* cited by examiner

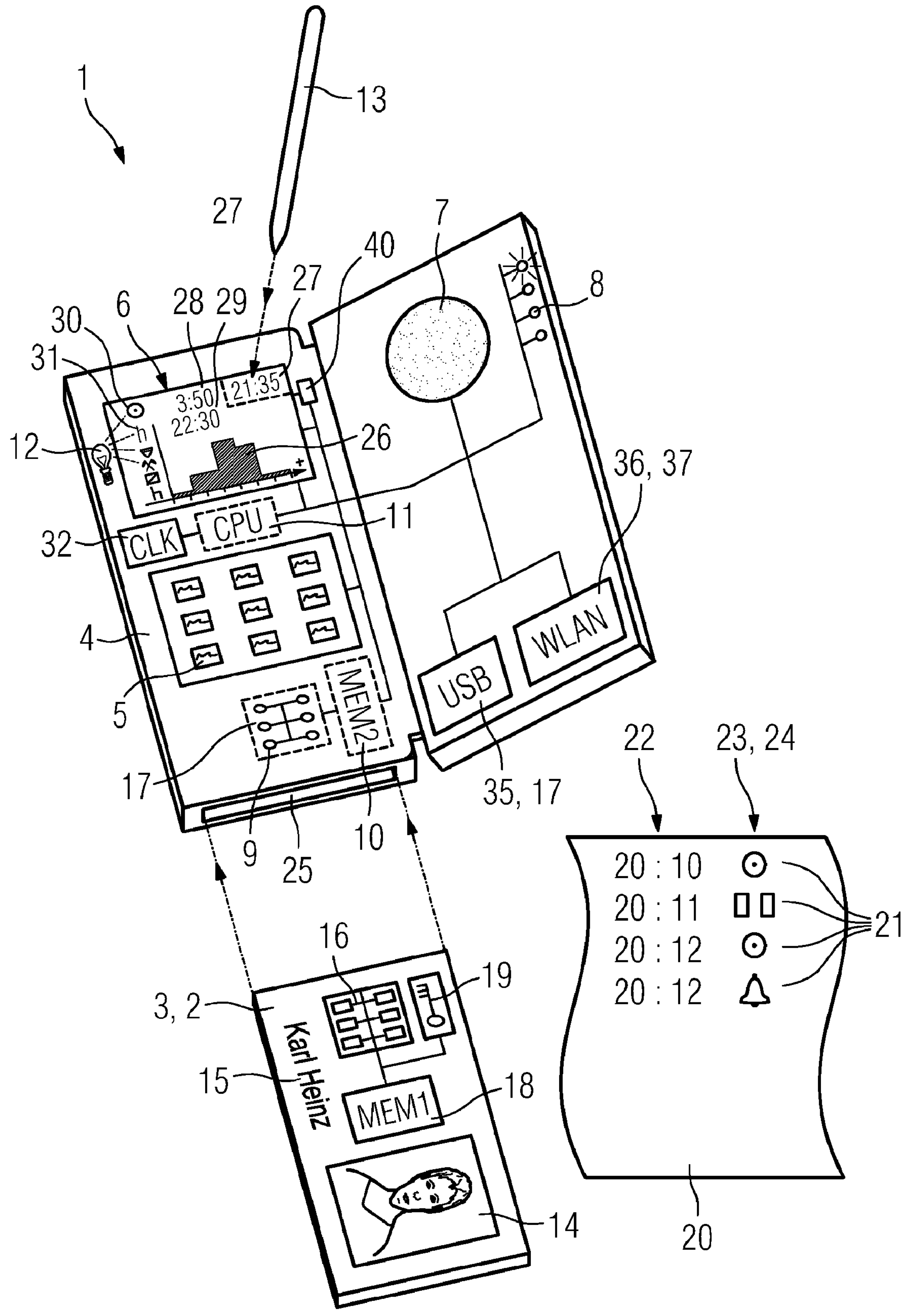
1
13
27
7
40
27
8
30
6
28
29
3:50
21:35
31
22:30
12
26
36, 37
32
CLK
CPU
11
4
WLAN
5
USB
MEM2
17
35, 17
9
25
10
22
23, 24
20 : 10
20 : 11
20 : 12
20 : 12
21
16
19
3, 2
Karl Heinz
15
MEM1
18
14
20

ARRANGEMENT WITH A MOBILE DATA CARRIER AND A HAND-HELD DEVICE

CROSS-REFERENCE TO RELATED APPLICATIONS

This application is a U.S. national stage application of International Application No. PCT/EP2006/066117 filed Sep. 7, 2006, which designates the United States of America, and claims priority to German application number 10 2005 043 624.2 filed Sep. 13, 2005, the contents of which are hereby incorporated by reference in their entirety.

TECHNICAL FIELD

The invention relates to an arrangement with a mobile data carrier and a handheld device for displaying driving times, rest times and other types of activity while a motor vehicle is operating, which handheld device has an evaluation unit, which evaluation unit is embodied in such a way that by means of said evaluation unit the driving times and/or rest times and/or times of other types of activity can be determined, which handheld device has a display unit by means of which the results of the evaluation can be displayed, and with an input unit by means of which a user can make entries by means of which the evaluation and/or the display can be controlled. In addition, the invention relates to a handheld device within the sense of the above arrangement.

BACKGROUND

Relevant guidelines, in particular the EEC regulation 3820/85, regulate the conditions for the operation of utility vehicles, in particular in commercial goods traffic, with respect to the activity of the driver of the vehicle. The regulations contain specifications relating to times of availability, of driving, of rest periods and of work on, for example, the goods to be moved, especially in order to keep the stressing of the drivers of vehicles within reasonable limits and in this way to avoid traffic being put in danger through overloaded road users. In order to check for compliance with, for example, the EEC regulation, recording devices, referred to as tachographs, are provided which are compulsorily installed in the respective utility vehicles and, in particular, record the driving times and rest times of the person driving the vehicle. Since the regulatory system for working times is comparatively complicated, configuring a working day in a way which conforms with the rules, in particular when there are frequently changing types of activity, is not easy since on the part of the company, profit orientated utilization of the permissible driving times is generally desired. The tachographs which record the driving times and rest times only provide assistance to a limited degree in this context since instructions for the scheduling of a break are not provided as a standard measure and the time when the driving operation is to be interrupted cannot be output.

So that the driver of a vehicle does not have to manually calculate the rest times and driving times, which would be prone to errors, the company Capital Enterprises (2000) Ltd. has already made available a device by the name of "Driver Hour Guard" which permits time segments of specific types of activity to be input and driving times and rest times to be determined therefrom in a way which is compatible with the rules. To do this it is necessary for the driver of the vehicle to input corresponding times and types of activity into the Driver Hour Guard in parallel (in real time). In the new generation of digital tachographs the possibility of reading off information from the diagram disk is no longer provided, and data items have to be called individually from the digital tachograph and input into the evaluation device. These procedures are extremely time consuming and prone to errors.

SUMMARY

An arrangement or a handheld device of the type mentioned at the beginning can be developed in such a way that steering times, rest times or times of other activities can be determined on the basis of recordings of a digital tachograph in a way which is comfortable, less prone to errors and less time consuming, therefore protecting the driver against infringements of existing laws.

According to an embodiment, an arrangement may comprise a mobile data carrier and a handheld device for displaying driving times, rest times and other types of activity which can be recorded by a tachograph while a motor vehicle is operating, wherein the handheld device has an evaluation unit embodied in such a way that by means of said evaluation unit the driving times and/or rest times and/or times of other types of activity can be determined, wherein the handheld device has a display unit by means of which the results of the evaluation can be displayed, and with an input unit by means of which a user can make entries by means of which the evaluation and/or the display can be controlled, wherein recording data is stored digitally in a memory of the mobile data carrier which is embodied as a data card, the handheld device has a data transmission interface which is embodied in such a way that the handheld device can set up a data transmitting connection to the mobile data carrier, and the evaluation unit is embodied in such a way that it determines, in an evaluating fashion, the driving times and/or rest times and/or times of other types of activity from the recording data, stored by means of the data carrier, of the tachograph, which data is accessed by the evaluation unit by means of the data transmission interface.

According to another embodiment, a handheld device for displaying driving times, rest times and other types of activity which can be recorded by a tachograph while a motor vehicle is operating, may have an evaluation unit embodied in such a way that by means of said evaluation unit the driving times and/or rest times and/or times of other types of activity can be determined, wherein the handheld device has a display unit by means of which the results of the evaluation can be displayed, wherein the handheld device has an input unit by means of which a user can make entries by means of which the evaluation and/or the display can be controlled, wherein the handheld device has a data transmission interface which is embodied in such a way that the handheld device can set up a data transmitting connection to a mobile data carrier, wherein recording data of the tachograph is stored digitally in a memory of the mobile data carrier which is embodied as a data card, the evaluation unit is embodied in such a way that it determines, in an evaluating fashion, the driving times and/or rest times and/or times of other types of activity from the recording data, stored by means of the mobile data carrier, of the tachograph, which data is accessed by the evaluation unit by means of the data transmission interface.

According to a further embodiment, the handheld device may have an insertion shaft for the data card, which insertion shaft surrounds the data card at least partially in the inserted state, and surrounds it in the region of connecting contacts which are provided on the data card. According to a further embodiment, the data carrier can be embodied in such a way that exclusively a read-only access of the handheld device to the memory of the data carrier is possible. According to a further embodiment, the recording data may comprise entries which each assign a type of activity to a time. According to a further embodiment, the handheld device may have a mass storage medium. According to a further embodiment, the handheld device may copy, at the start of the evaluation, at least some of the recording data from the data carrier into the mass storage medium. According to a further embodiment, the handheld device may have a USB port and/or an infrared interface and/or a WLAN interface and/or a microwave interface and/or a DECT interface and/or a Bluetooth interface and/or an interface for an external charger device and/or an external display. According to a further embodiment, the handheld device may have a loudspeaker, and a controller of the handheld device is embodied in such a way that the loudspeaker outputs an audible warning if the evaluation determines that a limiting value for the driving time is exceeded. According to a further embodiment, the evaluation may calculate a residual driving period which indicates how long a driver of a vehicle may still drive a means of transportation without exceeding a specific limiting value of the driving time, in particular the weekly driving time or residual weekly driving time. According to a further embodiment, the handheld device may have an actuating unit which actuates the display and may be embodied in such a way that symbols are assigned to the individual types of activity, and that the result of the evaluation which is assigned to the individual types of activity is respectively displayed together with a respective specific symbol. According to a further embodiment, the display may have a background lighting device for a transmitted light mode of the display unit. According to a further embodiment, the actuating unit may be embodied in such a way that a graphic speed profile or a graphic profile for driving times, rest times and other times can be displayed by means of the display unit. According to a further embodiment, the display unit can be embodied as a touch screen so that operator control elements are an integrated component of the display unit. According to a further embodiment, the handheld device may have at least one lighting element, in particular a light emitting diode, which is actuated in such a way that it displays an operating state by means of its light emission or the color of its light emission, in particular indicates whether driving times have exceeded a specific limiting value, or rest times are less than a specific limiting value. According to a further embodiment, the handheld device may have an integrated clock, and the evaluation unit is embodied in such a way that it determines, from the recording data and the clock time, an ending time for the "driving" activity, or a time for the start of a break, and this ending time or this start is displayed by means of the display unit.

BRIEF DESCRIPTION OF THE DRAWINGS

In the text which follows a particular exemplary embodiment is described in order to clarify the invention with reference to a drawing, in which:

FIG. 1 shows a schematic illustration of an arrangement according to an embodiment or a handheld device according to an embodiment.

DETAILED DESCRIPTION

A mobile data carrier within the sense of the invention is to be understood in particular as a data card which is preferably embodied as a smart card, and also has a processor in addition to an internal memory and can form a signal transmitting connection to corresponding connecting contacts by means of contact elements. A handheld device according to an embodiment advantageously has a format which can be comfortably held in one hand and transported, for example, in a glove compartment, accordingly not exceeding the dimensions 20 cm×30 cm×3 cm. Determination of driving times, rest times or times of other types of activity is understood according to the invention to mean, in particular, determination in accordance with EEC Regulation 3820. An input unit according to an embodiment on the handheld device is preferably a keypad or a touch screen but can also be some other operator control element such as, for example, a rotational regulator which is embodied in the manner of a joystick and which permits navigation through a user menu. The recording data are stored digitally in a memory of the data carrier, with the storage preferably being in the form of nonencrypted plain text so that this data can be read out without knowledge of a cryptographic key. The memory of the mobile data carrier preferably only permits reading access to the recording data unless there is special authorization so that manipulation attempts on the sensitive data cannot be successful and the character of these recordings as legal evidence is preserved.

The particular advantage of the various embodiments is the convenient and brief transmission of the usually extremely extensive recording data of the tachograph so that not only does the user of the arrangement according to an embodiment or handheld device according to an embodiment profit from the saving in time and the convenience owing to the elimination of the need to make extensive manual entries, but also errors in the calculation for ensuring compliance with legal specifications are prevented. In addition, the arrangement according to an embodiment permits particularly precise calculation of the decisive times, and in this way permits comprehensive use of the legally permitted possibilities, which may enable the company which is equipped in this way to increase its profits. Furthermore, the driver of the vehicle is able to plan his route in advance with little expenditure and to suitably schedule corresponding breaks taking into account the local conditions.

According to an embodiment, the handheld device may have an insertion shaft for the data card, which insertion shaft surrounds the data card at least partially in the inserted state, in particular surrounding it in the region of connecting contacts which are provided on the data card. In this way it is possible, on the one hand, always to ensure that contact is reliably made with the connecting contacts of the data card since the surrounding of the data card permits it to be guided precisely and, on the other hand, to decisively reduce the risk of soiling of the interface which is embodied with conductive contacts.

The handheld device advantageously has a mass storage medium which can preferably be conceived for storage of the recording data on the mobile data carrier. It is particularly expedient if, at the start of an evaluation of the recording data, at least some of the recording data is copied from the data carrier into the mass storage medium. In this way very rapid access to this data is possible since the particular peripheral conditions of the data transmitting interface with the data card no longer need to be taken into account. If the handheld device is preferably used by one person, it is also conceivable for the recording data to be permanently stored in the mass storage medium and for only a corresponding reconciliation between the current entries from the mobile data carrier and the mass storage medium of the handheld device to be carried out. In this way it is additionally possible to save valuable time up to the display of the evaluation result by means of the handheld device.

In addition to the connecting contacts of the interface, which permit the data to be read from the data card, it is appropriate if the handheld device has a USB interface or an infrared interface or a WLAN interface or a microwave interface or a DECT interface or a Bluetooth interface, so that it is also possible to exchange data with other data carriers and with the handheld device.

In order to increase the operating convenience further it is appropriate if the handheld device has a loudspeaker, and a controller of the handheld device is embodied in such a way that the loudspeaker outputs an audible warning if the evaluation determines that a limiting value for the driving time is exceeded. A corresponding message can also be issued in such a way that a break has to be scheduled or a rest time would then have to start. Alternatively or additionally it is advantageously conceivable for the evaluation to calculate a residual driving period which indicates how long a driver of a vehicle may still drive a means of transportation without exceeding a specific limiting value of the driving time.

Since the display panel is subject to spatial restrictions owing to the compact format, it is appropriate, with the aim of increasing the density of information on the small format, if it has an actuating unit which actuates the display and is embodied in such a way that symbols are assigned to the individual types of activity, and that the result of the evaluation which is assigned to the respective individual types of activity is displayed together with a respective specific symbol. These pictograms are preferably configured in such a way that they are compatible with the pictograms defined in EEC Regulation 3821/85.

So that the device according to an embodiment can even be used in the dark, the display can advantageously have a background lighting device for a transmitted light mode. An embodiment of the actuating unit such that a graphic speed profile and driving time profile and rest time profile can be displayed by means of the display is particularly expedient and clear.

The display can expediently be embodied as a touch screen which means that separate operator control elements are eliminated and additional space is made available for the display panel, and at the same time sufficient input options are implemented. The operating state can expediently be displayed and, in particular, visual warning signals can also expediently be output by means of lighting elements which are preferably embodied as light emitting diodes and are actuated in such a way that they indicate, by means of their light emission or the color of the light emission, whether, for example, driving times have exceeded a specific limiting value.

The integration of a clock into the handheld device is particularly expedient so that the evaluation unit determines, for example, an ending time for the "driving" activity or "break" activity or determines a time for the start of a break or the next possible driving time using the clock time information, and this data can be displayed by means of the display unit.

In FIG. 1, an arrangement 1 according to an embodiment is provided with the reference sign 1, comprising a mobile data carrier 2 which is embodied as a data card 3, and a handheld device 4. The handheld device 4 is of foldable design and has, on one folding half, operator control elements 5 of an input unit, a display unit 6, and, on the other folding half, a loudspeaker 7 and light emitting diodes 8 as visible components. The schematic illustration also comprises components of the handheld device 4 which cannot be seen, for example a set 9 of contacts, a mass storage medium 10, an evaluation unit 11, a clock 32 and a background lighting device 12 for the display unit 6, with all the components interacting with one another functionally in a way which is symbolized by connecting lines.

By means of the operator control elements 5, a user can make settings on the handheld device, such as to the effect that the driving times or rest times or some other type of activity are to be evaluated, or which evaluation result is to be displayed. In addition, a user can also use the display unit 6 which is embodied as a touch screen to make inputs by means of a touch pen 13.

The data card 3 is assigned to the vehicle driver's person, which is symbolized in FIG. 1 by means of a representation 14 and a name 15. In addition, the data card 3 has connecting contacts 16 which can enter into a data transmitting connection with the data transmission interface 17 which is embodied as a set 9 of contacts. The connecting contacts 16 are connected to a memory 18 of the data card 3, with an encryption unit 19 being additionally provided for the authorized writing access to the memory 18. Recording data 20 are stored in the memory 18 as entries 21 which each assign a type 23 of activity (illustrated here by means of symbols 24) to a time 22.

If the data card 3 is introduced into an insertion shaft 25 of the handheld device 4, the set 9 of contacts enters into a data signal transmitting connection with the connecting contacts 16 so that reading access of the handheld device 4 to the memory 16 can take place. On the basis of a setting which is input by means of the operator control element 5 by a user (not illustrated), the handheld device 4 reads out recording data 20 and evaluates it by means of the evaluation unit 11 by temporarily storing it in the mass storage medium 10. Correspondingly, a speed profile 26 is displayed on the display unit 6, in which case, in addition to the current clock time 27, there are also an accumulated driving time 28 and the time 29 for the start of a break which is compulsory according to EEC Regulation 3820. The driving time 28 and the starting time 29 are displayed in a space saving fashion with an assignment to one symbol 30, 31 in each case. The evaluation unit 11 determines the starting time 29 including a clock time which is made available by a clock 32 which is integrated into the handheld device 4. If the evaluation unit 11 detects that a limiting value is exceeded, a warning is output by means of the loudspeaker 7 and one of the light emitting diodes 8.

The handheld device 4 has an actuating unit 40 which actuates the display and is embodied in such a way that symbols 24, 30, 31 are assigned to the individual types of activity, and in that the result of the evaluation which is assigned to the individual types of activity is respectively displayed together with a respective specific symbol 24, 30, 31.

The handheld device also has, in addition to the set 9 of contacts, further data transmission interfaces 17 which are embodied as an USB port 35 and as a WLAN interface 36 in the case of the illustrated handheld device 4.

What is claimed is:

1. An arrangement comprising a mobile data carrier and a handheld device for displaying activities which can be recorded by a tachograph while a motor vehicle is operating, wherein the handheld device has an evaluation unit configured such that by means of said evaluation unit driving times and/or rest times can be determined, wherein the handheld device has a display unit by means of which the results of an evaluation can be displayed, and with an input unit by means of which a user can make entries by means of which the evaluation and/or the display can be controlled, wherein recording data is stored digitally in a memory of the mobile data carrier which is embodied as a data card, the handheld device has a data transmission interface configured such that the handheld device can set up a data transmitting connection to the mobile data carrier, and the evaluation unit is configured such that it determines, in an evaluating fashion, the driving times and/or rest times from the recording data, stored by means of the data carrier, of the tachograph, which data is accessed by the evaluation unit by means of the data transmission interface, wherein the handheld device has a mass storage medium, and wherein the handheld device copies, at the start of the evaluation, at least some of the recording data from the data carrier into the mass storage medium.

2. The arrangement as claimed in claim 1, wherein the handheld device has an insertion shaft for the data card, which insertion shaft surrounds the data card at least partially in the inserted state, and surrounds it in the region of connecting contacts which are provided on the data card.

3. The arrangement as claimed in claim 1, wherein the data carrier is configured such that exclusively a read-only access of the handheld device to the memory of the data carrier is possible.

4. The arrangement as claimed in claim 1, wherein the recording data comprises entries which each assign a type of activity to a time.

5. The arrangement as claimed in claim 1, wherein the handheld device has a USB port and/or an infrared interface and/or a WLAN interface and/or a microwave interface and/or a DECT interface and/or a Bluetooth interface and/or an interface for an external charger device and/or an external display.

6. The arrangement as claimed in claim 1, wherein the handheld device has a loudspeaker, and a controller of the handheld device is configured such that the loudspeaker outputs an audible warning if the evaluation determines that a limiting value for the driving time is exceeded.

7. The arrangement as claimed in claim 1, wherein the evaluation calculates a residual driving period which indicates how long a driver of a vehicle may still drive a means of transportation without exceeding a specific limiting value of the driving time.

8. The arrangement as claimed in claim 1, wherein the handheld device has an actuating unit which actuates the display and is configured such that symbols are assigned to individual types of activities, and that the result of the evaluation which is assigned to individual types of activities is respectively displayed together with a respective specific symbol.

9. The arrangement as claimed in claim 1, wherein the display has a background lighting device for a transmitted light mode of the display unit.

10. The arrangement as claimed in claim 1, wherein the actuating unit is embodied such that a graphic speed profile or a graphic profile for driving times, rest times and other times can be displayed by means of the display unit.

11. The arrangement as claimed in claim 1, wherein the display unit is embodied as a touch screen so that operator control elements are an integrated component of the display unit.

12. The arrangement as claimed in claim 1, wherein the handheld device has at least one lighting element, in particular a light emitting diode, which is actuated such that it displays an operating state by means of its light emission or the color of its light emission.

13. The arrangement as claimed in claim 1, comprising an integrated clock, and the evaluation unit is configured such that it determines, from the recording data and the clock time, an ending time for the "driving" activity, or a time for the start of a break, and this ending time or this start is displayed by means of the display unit.

14. A handheld device for displaying activity which can be recorded by a tachograph while a motor vehicle is operating, which handheld device has an evaluation unit configured such that by means of said evaluation unit the driving times and/or rest times can be determined, wherein the handheld device has a display unit by means of which the results of an evaluation can be displayed, wherein the handheld device has an input unit by means of which a user can make entries by means of which the evaluation and/or the display can be controlled, wherein the handheld device has a data transmission interface which is embodied such that the handheld device can set up a data transmitting connection to a mobile data carrier, wherein recording data of the tachograph is stored digitally in a memory of the mobile data carrier which is embodied as a data card, the evaluation unit is configured such that it determines, in an evaluating fashion, the driving times and/or rest times from the recording data, stored by means of the mobile data carrier, of the tachograph, which data is accessed by the evaluation unit by means of the data transmission interface, wherein the handheld device has an integrated clock, and the evaluation unit is configured such that it determines, from the recording data and the clock time, an ending time for the "driving" activity, or a time for the start of a break, and this ending time or this start is displayed by means of the display unit.

15. The handheld device as claimed in claim 14, comprising an insertion shaft for the data card, which insertion shaft surrounds the data card at least partially in the inserted state, and surrounds it in the region of connecting contacts which are provided on the data card.

16. The handheld device as claimed in claim 14, wherein the data carrier is configured such that exclusively a read-only access of the handheld device to the memory of the data carrier is possible.

17. The handheld device as claimed in claim 14, wherein the recording data comprises entries which each assign a type of activity to a time.

18. The handheld device as claimed in claim 14, comprising a mass storage medium.

19. The handheld device as claimed in claim 17, wherein the handheld device is operable to copy, at the start of the evaluation, at least some of the recording data from the data carrier into the mass storage medium.

20. The handheld device as claimed in claim 14, comprising a USB port and/or an infrared interface and/or a WLAN interface and/or a microwave interface and/or a DECT interface and/or a Bluetooth interface and/or an interface for an external charger device and/or an external display.

21. The handheld device as claimed in claim 14, comprising a loudspeaker, and a controller of the handheld device is configured such that the loudspeaker outputs an audible warning if the evaluation determines that a limiting value for the driving time is exceeded.

22. The handheld device as claimed in claim 14, wherein the evaluation calculates a residual driving period which indicates how long a driver of a vehicle may still drive a means of transportation without exceeding a specific limiting value of the driving time.

23. The handheld device as claimed in claim 14, comprising an actuating unit which actuates the display and is configured such that symbols are assigned to individual types of activity, and that the result of the evaluation which is assigned to the individual types of activity is respectively displayed together with a respective specific symbol.

24. The handheld device as claimed in claim 14, wherein the display has a background lighting device for a transmitted light mode of the display unit.

25. The handheld device as claimed in claim 14, wherein the actuating unit is configured such that a graphic speed profile or a graphic profile for driving times and rest times can be displayed by means of the display unit.

26. The handheld device as claimed in claim 14, wherein the display unit is embodied as a touch screen so that operator control elements are an integrated component of the display unit.

27. The handheld device as claimed in claim 14, comprising at least one lighting element, in particular a light emitting diode, which is configured such that it displays an operating state by means of its light emission or the color of its light emission.

* * * * *